United States Patent
Maleki et al.

(10) Patent No.: US 11,595,634 B2
(45) Date of Patent: Feb. 28, 2023

(54) DETECTION AND RANGING BASED ON A SINGLE MONOSCOPIC FRAME

(71) Applicant: BITANIMATE, INC., Lake Oswego, OR (US)

(72) Inventors: Behrooz Maleki, West Linn, OR (US); Sarvenaz Sarkhosh, West Linn, OR (US)

(73) Assignee: BITANIMATE, INC., Lake Oswego, OR (US)

( * ) Notice: Subject to any disclaimer, the term of this patent is extended or adjusted under 35 U.S.C. 154(b) by 0 days.

(21) Appl. No.: 17/701,565

(22) Filed: Mar. 22, 2022

(65) Prior Publication Data

US 2022/0217320 A1 Jul. 7, 2022

Related U.S. Application Data

(63) Continuation of application No. 17/642,946, filed as application No. PCT/US2020/015278 on Jan. 27, 2020.

(Continued)

(51) Int. Cl.
*H04N 13/261* (2018.01)
*H04N 13/00* (2018.01)

(52) U.S. Cl.
CPC ... *H04N 13/261* (2018.05); *H04N 2013/0081* (2013.01)

(58) Field of Classification Search
CPC ............... H04N 13/261; H04N 2013/0081

(Continued)

(56) References Cited

U.S. PATENT DOCUMENTS

2008/0150946 A1* 6/2008 Kuo .................. G06T 11/60
345/442
2008/0247670 A1* 10/2008 Tam .................. G06T 7/50
348/51

(Continued)

FOREIGN PATENT DOCUMENTS

CN 103609104 A 2/2014

OTHER PUBLICATIONS

CN Office Action dated Mar. 11, 2022 as received in Application No. 201910328119.4.

(Continued)

*Primary Examiner* — Tung T Vo
(74) *Attorney, Agent, or Firm* — Maschoff Brennan (57) ABSTRACT

One or more stereoscopic images are generated based on a single monoscopic image that may be obtained from a camera sensor. Each stereoscopic image includes a first digital image and a second digital image that, when viewed using any suitable stereoscopic viewing technique, result in a user or software program receiving a three-dimensional effect with respect to the elements included in the stereoscopic images. The monoscopic image may depict a geographic setting of a particular geographic location and the resulting stereoscopic image may provide a three-dimensional (3D) rendering of the geographic setting. Use of the stereoscopic image helps a system obtain more accurate detection and ranging capabilities. The stereoscopic image may be any configuration of the first digital image (monoscopic) and the second digital image (monoscopic) that together may generate a 3D effect as perceived by a viewer or software program.

14 Claims, 6 Drawing Sheets

Related U.S. Application Data (60) Provisional application No. 62/797,114, filed on Jan. 25, 2019.

(58) Field of Classification Search
USPC .................................................. 348/42–43
See application file for complete search history.

(56) References Cited

U.S. PATENT DOCUMENTS

| | | | |
|---|---|---|---|
| 2009/0195643 A1* | 8/2009 | Neuman | H04N 13/261 348/51 |
| 2012/0188334 A1* | 7/2012 | Fortin | H04N 13/261 348/E13.064 |
| 2012/0300034 A1 | 11/2012 | Atanassov et al. | |
| 2013/0147911 A1* | 6/2013 | Karsch | H04N 13/261 348/43 |
| 2015/0179218 A1* | 6/2015 | Nadler | H04N 13/363 382/154 |
| 2017/0035268 A1* | 2/2017 | Kumar | A61B 1/00009 |
| 2017/0142404 A1* | 5/2017 | Maleki | G06T 17/05 |
| 2017/0277980 A1* | 9/2017 | Taylor | G06V 20/176 |
| 2017/0316605 A1* | 11/2017 | Herman | H04N 13/275 |
| 2017/0366799 A1* | 12/2017 | Maleki | H04N 13/221 |
| 2020/0221069 A1* | 7/2020 | Wang | G06T 7/70 |

OTHER PUBLICATIONS

International Search Report dated Jan. 12, 2021 as received in application No. PCT/US2020/15278.
Written Opinion dated Jan. 12, 2021 as received in application No. PCT/US2020/15278.

* cited by examiner

| Method 200 | |
|---|---|
| Block 205 | Obtaining A First Digital Image Via A Detection Application |
| Block 210 | Based On The First Digital Image, Generating A Second Digital Image |
| Block 215 | Generating A Stereoscopic Image |

DETECTION AND RANGING BASED ON A SINGLE MONOSCOPIC FRAME

FIELD

The embodiments discussed in this disclosure relate to detection and ranging based on a single monoscopic frame.

BACKGROUND

Detection and ranging applications have increased in demand with the advent of autonomous and semi-autonomous vehicles. To help facilitate autonomous and semi-autonomous operation of vehicles, an ability to detect and range objects in an environment becomes increasingly helpful. Further considerations of autonomous and semi-autonomous operation of vehicles may include safety, such as an ability to stay on a trajectory of travel and avoid collisions with objects. Accordingly, some systems have been developed for detection, ranging, and/or safety purposes.

For example, in some conventional systems, actual three-dimensional cameras may be used to capture three-dimensional images. In other conventional systems, a multitude of monoscopic cameras may be employed to create a three-dimensional effect when the combined images from all the different cameras are stitched together. Such systems are vision-based, while other conventional systems may be signal-based. For example, RADAR uses radio signals and LIDAR uses laser signals to detect and range objects. However, each of the foregoing conventional systems may be deficient in one or more aspects. For example, three-dimensional cameras are bulky and/or expensive, as is LIDAR technology or a host of monoscopic cameras like the approximately eight cameras used by some TESLA® autonomous/semi-autonomous vehicles. In addition to cost, size, and/or ease of implementation, technology limitations may also be a factor. For example, LIDAR may have limited usage at nighttime, in cloudy weather, or at high altitudes (e.g., above 2000 meters). Additionally, for example, RADAR may not detect small objects or provide a precise image of an object due to wavelength of the radio signals.

In addition, humans have a binocular vision system that uses two eyes spaced approximately two and a half inches (approximately 6.5 centimeters) apart. Each eye sees the world from a slightly different perspective. The brain uses the difference in these perspectives to calculate or gauge distance. This binocular vision system is partly responsible for the ability to determine with relatively good accuracy the distance of an object. The relative distance of multiple objects in a field-of-view may also be determined with the help of binocular vision.

Three-dimensional (stereoscopic) imaging takes advantage of the depth perceived by binocular vision by presenting two images to a viewer where one image is presented to one eye (e.g., the left eye) and the other image is presented to the other eye (e.g., the right eye). The images presented to the two eyes may include substantially the same elements, but the elements in the two images may be offset from each other to mimic the offsetting perspective that may be perceived by the viewer's eyes in everyday life. Therefore, the viewer may perceive depth in the elements depicted by the images.

SUMMARY

According to one or more embodiments of the present disclosure, one or more stereoscopic images may be generated based on a single monoscopic image that may be obtained from a camera sensor. The stereoscopic images may each include the first digital image and the second digital image that, when viewed using any suitable stereoscopic viewing technique, may result in a user or software program receiving a three-dimensional effect with respect to the elements included in the stereoscopic images. The monoscopic image may depict a geographic setting of a particular geographic location and the resulting stereoscopic image may provide a three-dimensional (3D) rendering of the geographic setting. Use of the stereoscopic image may help a system obtain more accurate detection and ranging capabilities. Reference to a "stereoscopic image" in the present disclosure may refer to any configuration of the first digital image (monoscopic) and the second digital image (monoscopic) that together may generate a 3D effect as perceived by a viewer or software program.

DETAILED DESCRIPTION

Figure 1A:
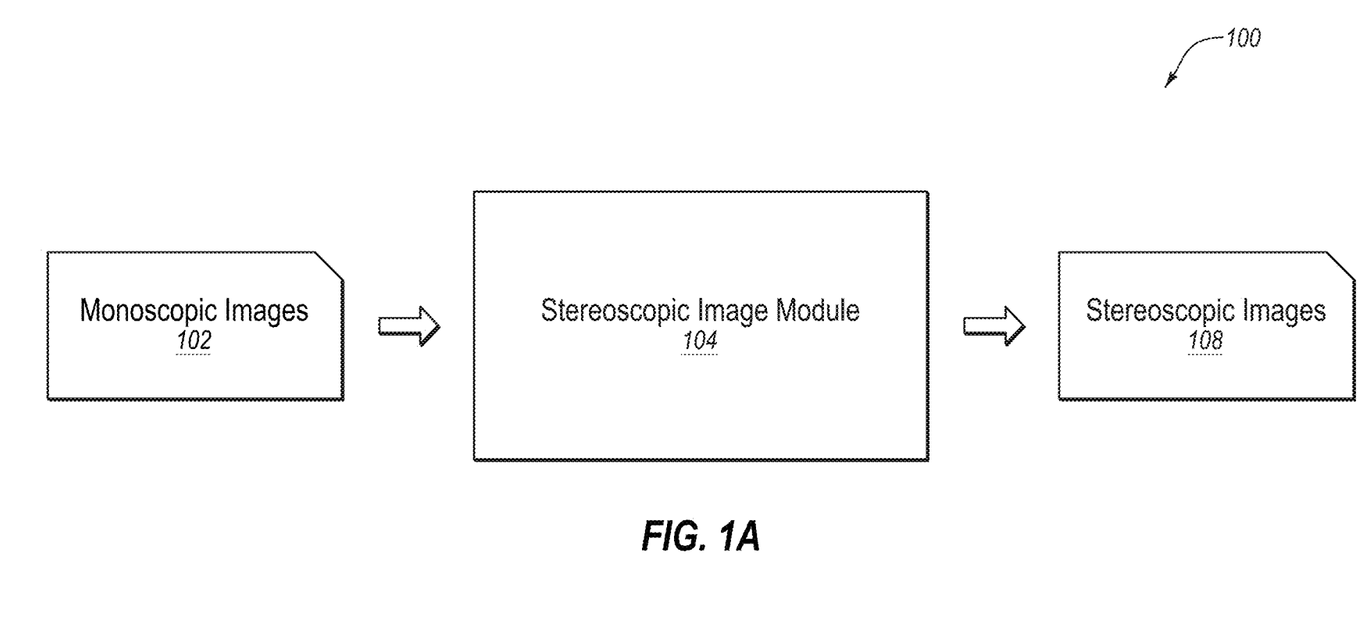
FIG. 1A illustrates an example system configured to generate stereoscopic (3D) images, according to some embodiments of the present disclosure.

FIG. 1A illustrates an example system 100 configured to generate stereoscopic (3D) images, according to some embodiments of the present disclosure. The system 100 may include a stereoscopic image generation module 104 (referred to hereinafter as "stereoscopic image module 104") configured to generate one or more stereoscopic images 108. The stereoscopic image module 104 may include any suitable system, apparatus, or device configured to receive monoscopic images 102 and to generate each of the stereoscopic images 108 based on two or more of the monoscopic images 102. For example, in some embodiments, the stereoscopic image module 104 may include software that includes computer-executable instructions configured to cause a processor to perform operations for generating the stereoscopic images 108 based on the monoscopic images 102.

In some embodiments, the monoscopic images 102 may include digital images obtained by a camera sensor that depict a setting. For example, the monoscopic images 102 may include digital images that depict an object in the setting. In some embodiments, the object may be any element that is visually detectable, such as a tree, a pedestrian, a flying bird, an airplane, an airborne missile, a ship, a buoy, a river or ocean, a curb, a traffic sign, traffic lines (e.g., double lines indicating a "no pass zone"), a mountain, a wall, a house, a fire hydrant, a dog, or any other suitable object visually detectable by a camera sensor. In some embodiments, the stereoscopic image module 104 may be configured to acquire the monoscopic images 102 via a detection application communicatively coupled to the camera sensor. As referred to in the present disclosure, "detection application" is short for "detection and ranging application."

Figure 1B:
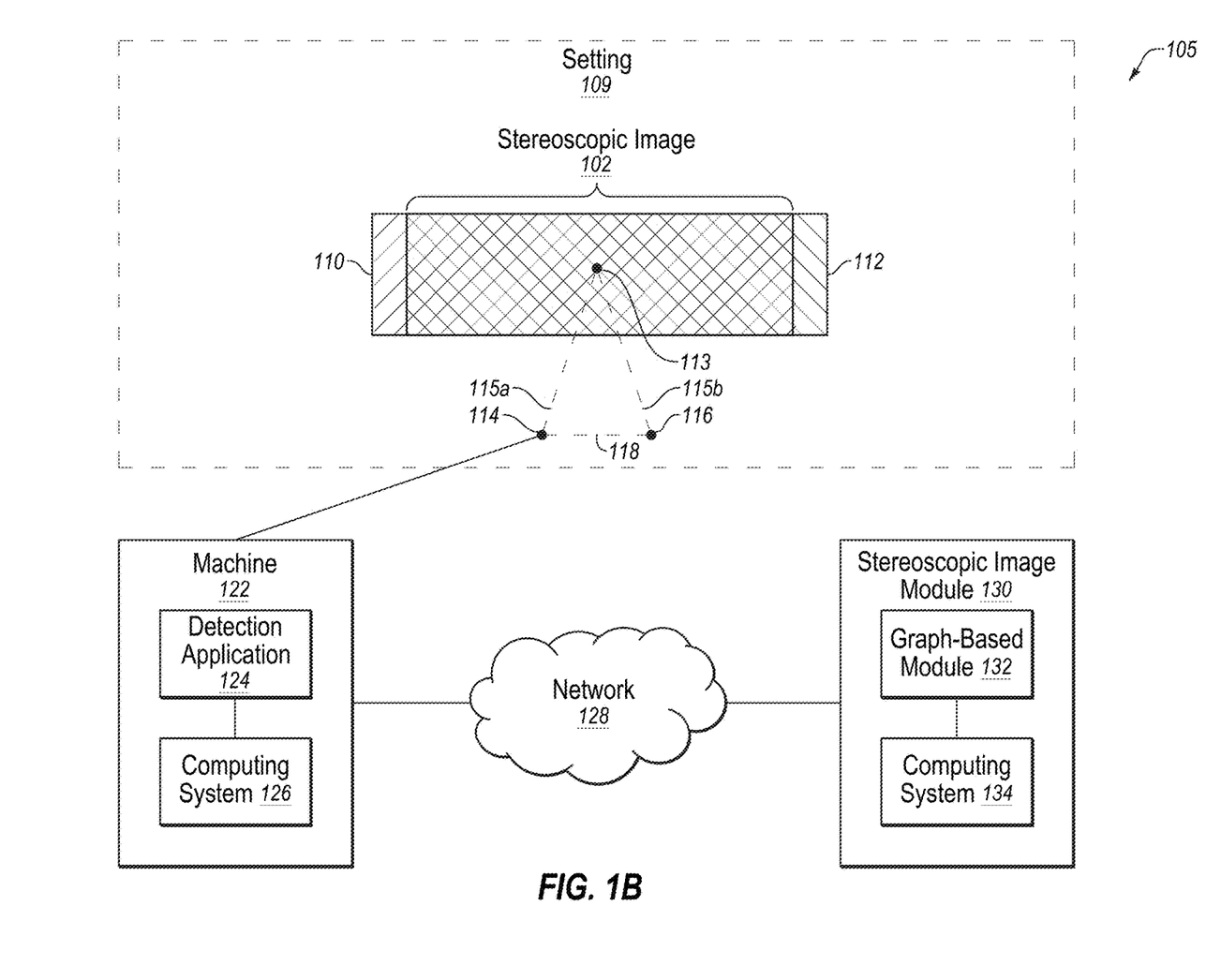
FIG. 1B illustrates an example environment in which stereoscopic image generation based on a single monoscopic frame occurs.

In some embodiments, the stereoscopic image module 104 may be configured to access the detection application (such as the detection application 124 of FIG. 1B) via any suitable network such as the network 128 of FIG. 1B to request the monoscopic images 102 from the detection application. In these or other embodiments, the detection application and associated monoscopic images 102 may be stored on a same device that may include the stereoscopic image module 104. In these or other embodiments, the stereoscopic image module 104 may be configured to access the detection application stored on the device to request the monoscopic images 102 from a storage area of the device on which they may be stored.

Additionally or alternatively, the stereoscopic image module 104 may be included with the detection application in which the stereoscopic image module 104 may obtain the monoscopic images 102 via the detection application by accessing portions of the detection application that control obtaining the monoscopic images 102. In other embodiments, the stereoscopic image module 104 may be separate from the detection application (e.g., as shown in FIG. 1B), but may be configured to interface with the detection application to obtain the monoscopic images 102.

The stereoscopic image module 104 may be configured to generate the stereoscopic images 108 as indicated below. To aid in explanation of the concepts, the description is given with respect to generation of an example stereoscopic image 120 (illustrated in FIG. 1B and described below), which may be an example of one of the stereoscopic images 108 of FIG. 1A. Further, the description is given with respect to generation of the stereoscopic image 120 based on an example first digital image 110 and an example second digital image 112, which are illustrated in FIG. 1B. The first digital image 110 and the second digital image 112 are examples of monoscopic images that may be included with the monoscopic images 102 of FIG. 1A.

FIG. 1B illustrates an example environment 105 in which stereoscopic image generation based on a single monoscopic frame occurs. The elements of FIG. 1B may be arranged according to one or more embodiments of the present disclosure. As illustrated, FIG. 1B includes: a machine 122 having a detection application 124 and a computing system 126; a network 128; and a stereoscopic image module 130 having a graph-based model 132 and a computing system 134. Further illustrated are a setting 109, a first digital image 110, a second digital image 112, a focal point 113, a camera 114, focal distances 115a/115b, an imaginary camera 116, and a displacement factor 118. In some embodiments, the stereoscopic image module 130 may be the same as or similar to the stereoscopic image module 104 described above in conjunction with FIG. 1A. Additionally or alternatively, the computing system 126 and the computing system 134 may be the same as or similar to the system 300 described below in conjunction with FIG. 3.

In some embodiments, the setting 109 may include any geographical setting in which the camera 114 may capture an image. For example, the setting 109 may include garages, driveways, streets, sidewalks, oceans, rivers, skies, forests, cities, villages, landing/launching areas such as airport runways and flight decks, warehouses, stores, inventory aisles, and any other suitable environment in which the machine 122 may detect and range objects. Accordingly, when the camera 114 captures the first digital image 110, the first digital image 110 may include any aspect and/or portion of the setting 109. Additionally or alternatively, the first digital image 110 may include the focal point 113 based on the focal distance 115a of the camera 114. In these or other embodiments, the focal distance 115a to the focal point 113 may be a known constant based on specifications of the camera 114.

In some embodiments, the camera 114 may be attached to the machine 122. In the present disclosure, reference to "machine" may refer to any device configured to store and/or execute computer code, e.g., executable instructions of a software application. In some embodiments, the machine may be movable from a first geographic position (e.g., "Point A") to a second geographic position (e.g., "Point B"). In these or other embodiments, the machine 122 may be autonomous or semi-autonomous with respect to moving between geographic positions. Alternatively, the machine 122 may be human-operated between geographic positions. Examples of a machine 122 may include robots, drones, rockets, space stations, self-driving cars/trucks, human-operated cars/trucks, equipment (e.g., construction/maintenance equipment such as a backhoe, a street-sweeper, a steam roller, etc.), storage pods (e.g., a transportable storage unit, etc.), or any other suitable device configured to move between geographic positions.

Additionally or alternatively, the machine may include a device that is stationary, and in some embodiments, fixed in position. For example, the machine may include an anti-missile device stationed at a military base, a security device fixed at a perimeter of a prison, a hovering helicopter, or any other suitable machine, whether temporarily stationary or permanently fixed in position. Additionally or alternatively, the machine may include a client device. Some examples of the client device may include a mobile phone, a smartphone, a tablet computer, a laptop computer, a desktop computer, a set-top box, a virtual-reality device, a wearable device, a connected device, any mobility device that has an operating system, a satellite, etc.

In these or other embodiments, the detection and ranging capabilities of the machine 122 enabled by the present application may be advantageous in any variety of fields or industries, including, for example: commercial/industrial purposes, manufacturing purposes, military purposes (e.g., Army, Navy, National Guard, Marines, Air Force, and Space Force), government agency purposes (e.g., Federal Bureau of Investigations, Central Intelligence Agency, and National Transportation Safety Board), etc.

Additionally or alternatively, the machine 122 may detect and/or range along a trajectory. The trajectory may include any path of travel and/or a surrounding area for the machine 122, whether in air, on land, in space, or on water. In these or other embodiments, the camera 114 may be configured to capture in the first digital image 110 a portion of the trajectory of the machine 122, e.g., the portion of the trajectory nearest to the machine 122, another portion of the trajectory farthest away from the machine 122, or another portion not necessarily part of the trajectory of the machine 122. As an example, the camera 114 may capture a portion of the trajectory up to about two meters away from the machine 122; up to about five meters away from the machine 122; up to about twenty meters away from the machine 122; up to about fifty meters away from the machine 122; up to about one hundred meters away from the machine 122; up to about two hundred meters away from the machine 122; up to about five hundred meters away from the machine 122; up to about one thousand meters away from the machine 122; up to about five thousand meters away from the machine 122; etc. The advancement of camera technology (including camera lens technology) may continue to facilitate advantages in imaging speed, resolution, measurement accuracy, and focal distances.

In some embodiments, the first digital image 110 captured by the camera 114 may be obtained by the detection application 124. For example, the detection application 124 may request the first digital image 110 from the camera 114. Additionally or alternatively, the detection application 124 may receive the first digital image 110 as sent from the camera 114.

In these or other embodiments, the stereoscopic image module 130 may obtain the first digital image 110 from the detection application 124. For example, the stereoscopic image module 130 may request the first digital image 110 from the detection application 124. Additionally or alternatively, the stereoscopic image module 130 may receive the first digital image 110 as sent from the detection application 124. In these or other embodiments, the stereoscopic image module 130 may obtain the first digital image 110 via the network 128, e.g., where the stereoscopic image module 130 is positioned remotely from the machine 122 as shown in FIG. 1B, such as a remote server. The remote server may be the same as or similar to the computing system 134. Additionally or alternatively, the remote server may include one or more computing devices, such as a rackmount server, a router computer, a server computer, a personal computer, a mainframe computer, a laptop computer, a tablet computer, a desktop computer, a smartphone, cars, drones, a robot, any mobility device that has an operating system, etc.), data stores (e.g., hard disks, memories, databases), networks, software components, and/or hardware components. In other embodiments, the stereoscopic image module 130 may obtain the first digital image 110 without the network 128, e.g., where the stereoscopic image module 130 is integrated with the machine 122 (e.g., not positioned at the remote server).

In some embodiments, the network 128 may be any network or configuration of networks configured to send and receive communications between systems and devices. In some embodiments, the network 128 may include a conventional type network, a wired or wireless network, and may have numerous different configurations. Additionally or alternatively, the network 128 may include any suitable topology, configuration or configurations including a star configuration, token ring configuration, or other configurations. The network 128 may include a local area network (LAN), a wide area network (WAN) (e.g., the Internet), DECT ULE, and/or other interconnected data paths across which multiple devices may communicate. In some embodiments, the network 128 may include a peer-to-peer network. The network 128 may also be coupled to or include portions of a telecommunications network that may enable communication of data in a variety of different communication protocols. In some embodiments, the network 128 may include BlueTooth® communication to networks (e.g., MESH Bluetooth) and/or cellular communication networks for sending and receiving data including via short messaging service (SMS), multimedia messaging service (MMS), hypertext transfer protocol (HTTP), direct data connection, wireless application protocol (WAP), e-mail, or the like. Further, the network 128 may include WiFi, LTE, LTE-Advanced, 1G, 2G, 3G, 4G, 5G, etc., ZigBee®, LoRA®—a wireless technology developed to enable low data rate communications to be made over long distances by sensors and actuators for machine to machine communication and internet of things (IoT) applications—wireless USB, or any other such wireless technology.

In some embodiments, after the first digital image 110 is obtained by the stereoscopic image module 130, the stereoscopic image module 130 may input the first digital image 110 into the graph-based model 132. As referred to in the present disclosure, the term "graph-based model" may include a deep neural network, a deep belief network, a recurrent neural network, or some other graph model such as a genetic programming model or a tree-based or forest-based machine learning model. Thus, the graph-based model 132 may include any artificial intelligence system or learning-based mechanism, examples of which may include: perceptron, multilayer peceptron, feed forward, radial basis network, deep feed forward, recurrent neural network, long/short term memory, gated recurrent unit, auto encoder, variational auto encoder, denoising auto encoder, sparse auto encoder, any sequence-to-sequence model, shallow neural networks, markov chain, hopfield network, boltzmann machine, restricted boltzmann machine, deep belief network, deep convolutional network, convolutional neural network (e.g., VGG-16), deconvolutional network, deep convolutional inverse graphics network, modular neural network, generative adversarial network, liquid state machine, extreme learning machine, echo state network, recursive neural network, deep residual network, kohonen network, support vector machine, neural taring machine, etc.

In some embodiments, the graph-based model 132 may be trained to generate (e.g., with help of the system 134) the second digital image 112 based on input in the form of the first digital image 110. The training of the graph-based model 132 is described later in this disclosure. In these or other embodiments, the second digital image 112 may be configured to be an image of a same area or a similar area of the setting 109. Thus, in some embodiments, the first digital image 110 and the second digital image 112 may substantially overlap. In these or other embodiments, data may be discarded that corresponds to portions where the first digital image 110 the second digital image 112 do not overlap. Additionally or alternatively, the second digital image 112 may be generated as a monoscopic image that visually mimics what the imaginary camera 116 would image if the imaginary camera 116 were an actual camera like the camera 114. In these or other embodiments, the imaginary camera 116 is virtually positioned at a different position from an actual position of the camera 114. Thus, in some embodiments, an object imaged in the first digital image 110 may be imaged from a first position and/or at a first angle. Additionally or alternatively, the object may be imaged in the second digital image 112 from a second position and/or at a second angle such that the second position and/or the second angle are different from the first position and the first angle, respectively. In this manner, the stereoscopic image 120 with perceptible depth may be generated using the first digital image 110 captured by the camera 114 and the second digital image 112 generated by the stereoscopic image module 130.

In these or other embodiments, the positional relationship of the camera 114 relative to the imaginary camera 116 may include the displacement factor 118. As referred to in the present disclosure, the displacement factor 118 may include: an angle or orientation with respect to one or more axes (e.g., roll, pitch, and yaw), an offset lateral distance or offset vertical height, etc. In some embodiments, the displacement factor 118 may be a known constant. Additionally or alternatively, the displacement factor 118 may be set at a value such that the stereoscopic image 120 resulting from the second digital image 112 is of sufficient quality and accuracy. For example, the displacement factor 118 may be set at a value such that distance measurements based on the stereoscopic image 120 are sufficiently accurate and/or fit a certain model.

Figure 4:
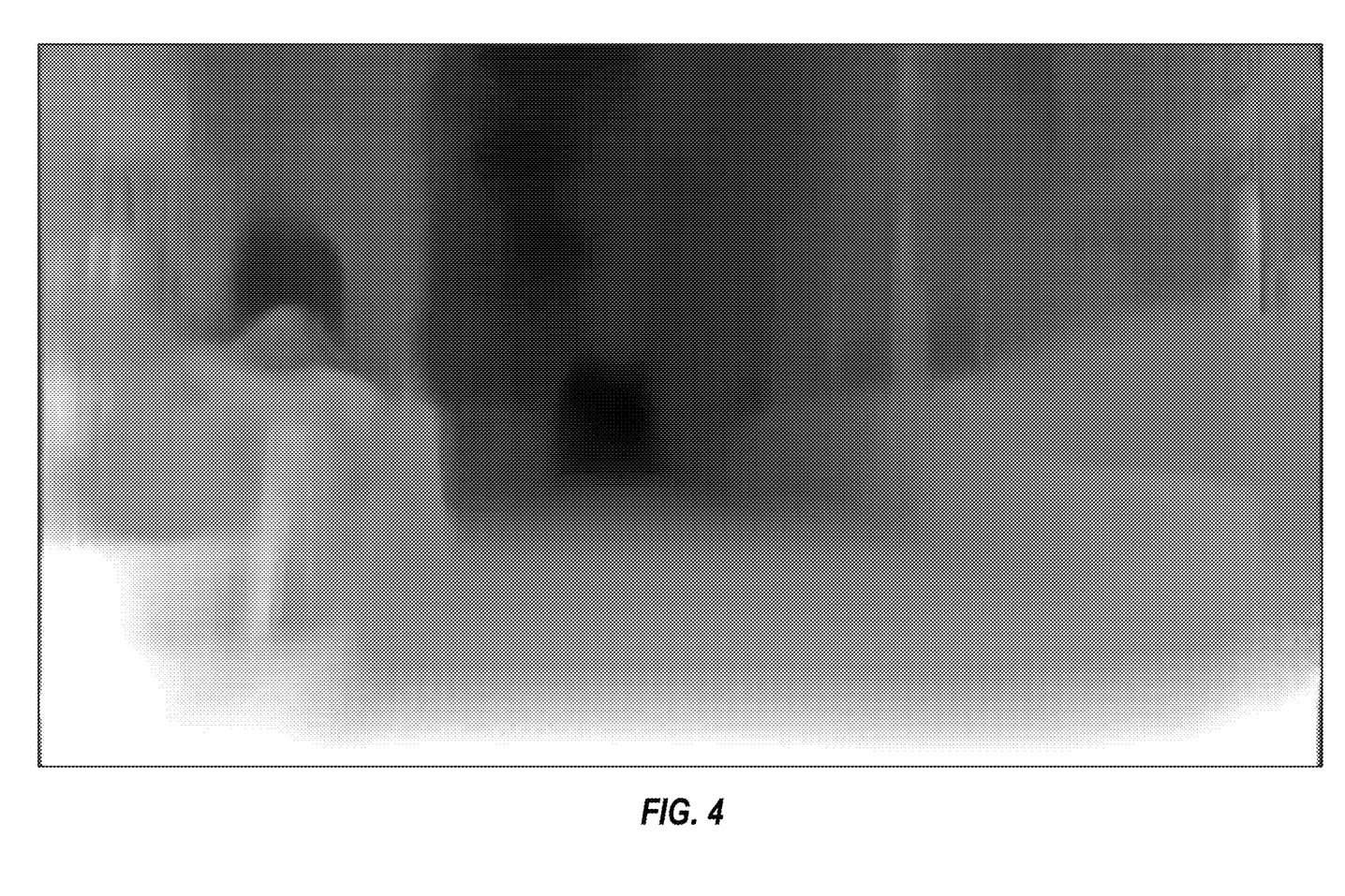
FIG. 4 illustrates an example of a depth map generated by a detection application and/or a stereoscopic image module.

In some embodiments, the stereoscopic image 120 may be used to generate a depth map. For example, the detection application 124 and/or the stereoscopic image module 130 may generate the depth map. An example of a depth map is illustrated in FIG. 4. The depth map may include a corresponding pixel for each pixel in the stereoscopic image 120. Each corresponding pixel in the depth map may be representative of relative distance data from the camera 114 for each respective pixel in the stereoscopic image 120. For example, a pixel in the depth map having a certain shade of purple or gray-scale may correspond to a particular relative distance, which is not an actual distance value. Thus, in some embodiments, a pixel in a first depth map and a pixel in a second depth map may include a same shade of color or gray-scale, yet have different actual distance values (e.g., even orders of magnitude different actual distance values). In this manner, color or gray-scale in the generated depth map does not represent an actual distance value for a pixel; rather, the color or gray-scale of a pixel in the generated depth map may represent a distance value relative to adjacent pixels.

In some embodiments, a subset of pixels of a total amount of pixels in the depth map may be associated with an object. For example, the detection application 124 and/or the stereoscopic image module 130 may determine that the subset of pixels in the depth map is indicative of the object. In this manner, a presence of an object may be preliminarily identified or detected, though not necessarily ranged. To range the detected object, a portion of the subset of pixels associated with the object may be analyzed. In some embodiments, the portion of the subset of pixels may be analyzed as opposed to the entire subset of pixels associated with the object to reduce computational overhead, increase ranging speed, etc. For example, every pixel associated with a pedestrian (e.g., the feet, legs, torso, neck, and head) need not all be ranged. Rather, one or more portions of pixels associated with the pedestrian may be considered as representative of where the pedestrian is located relative to the camera 114 for ranging purposes. In these or other embodiments, the subset of pixels associated with the object may be averaged, segmented, or otherwise simplified to a portion of the subset of pixels. Additionally or alternatively, a resolution of one or both of the stereoscopic image 120 and the depth map may be temporarily decreased (and later restored to original resolution). In this manner, the portion of the subset of pixels may include relative distance data sufficiently representative of the object.

In some embodiments, the relative distance data for the object may be converted to an actual distance value (e.g., in inches, feet, meters, kilometers, etc.). To convert the relative distance data based on the depth map to an actual distance value to an object, a pre-determined relationship between the relative distance data, the focal point 113 of the first digital image 110 and the second digital image 112, the displacement factor 118 between the camera 114 and the imaginary camera 116, and/or a correction curve that compensates for an offset in distance measurements based on perceived depth in the stereoscopic image. In these or other embodiments, as the distance from the camera 114 increases, the relative distance data in the depth map may decrease in accuracy. Therefore, once the actual distance data is converted from the relative distance data, an amount of offset from the actual distance data may be graphed or fitted to a curve as a function of actual distance. Thus, in some embodiments, a curve of correction values may be implemented to correct an offset from the actual distance data.

Figure 5:
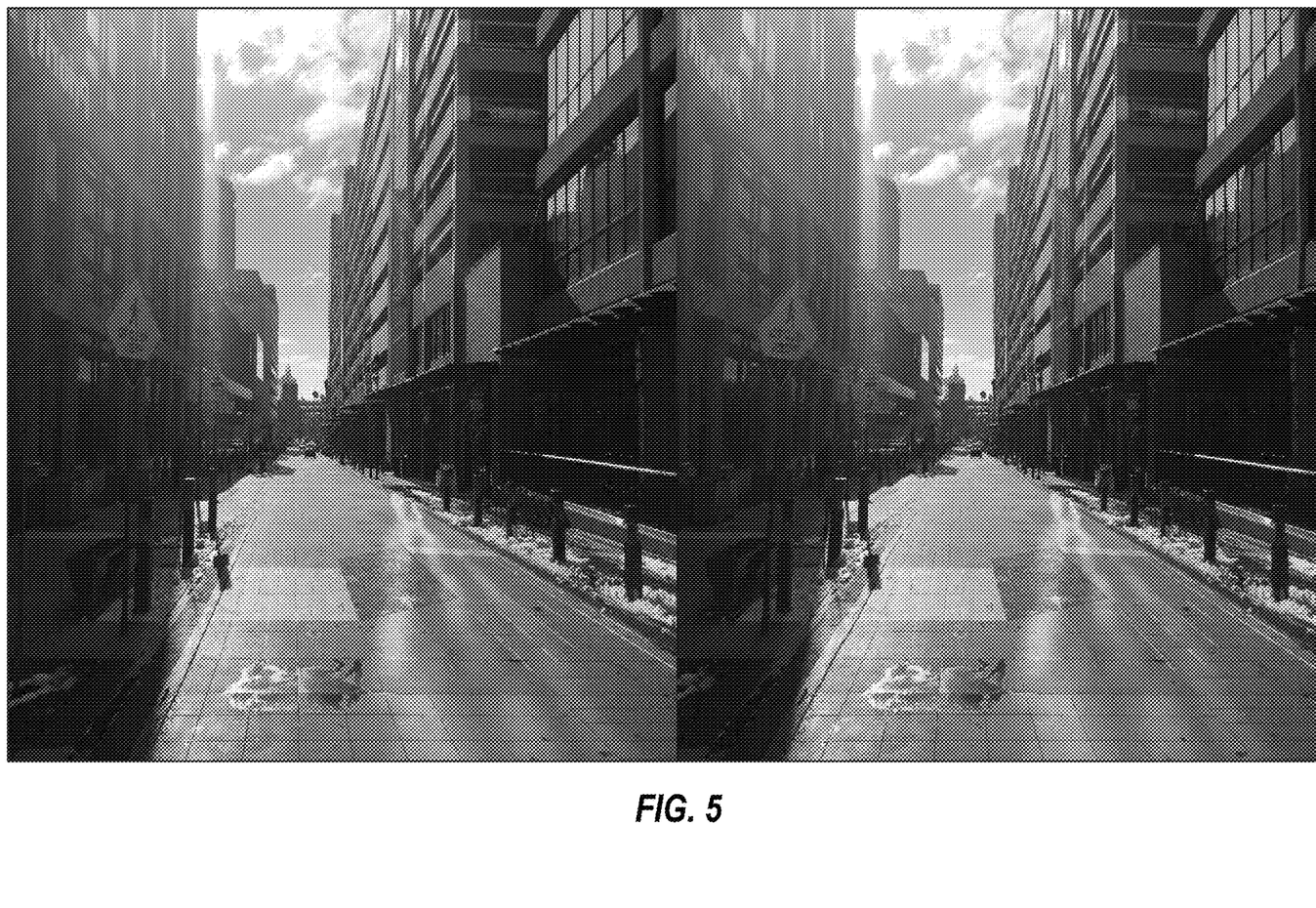
FIG. 5 illustrates an example of a stereoscopic pair provided to a graph-based model for training purposes.

In some embodiments, the graph-based model 132 may be trained to generate the second digital image 112 based on a single monoscopic image such as the first digital image 110 for subsequent generation of the stereoscopic image 120. To train the graph-based model 132, stereoscopic pair images may be provided to the graph-based model 132. The stereoscopic pair images may include a first monoscopic image and a second monoscopic image. An example of a stereoscopic pair provided to the graph-based model 132 for training purposes is illustrated in FIG. 5. In these or other embodiments, the first monoscopic image and the second monoscopic image may include images taken of any same or similar setting, but from different positions and/or angles. In this manner, the first monoscopic image and the second monoscopic image taken together may for a stereoscopic pair with perceivable depth. Additionally or alternatively, the first monoscopic image and the second monoscopic image may include a setting 109 of any type, nature, location, or subject. Some stereoscopic pair images may be related by type, nature, location, or subject; however, diversity among the stereoscopic pair images in addition to increased quantity may help improve a training quality or capability of the graph-based model 132 to generate the second digital image 112 and the stereoscopic image 120 of sufficient quality and accuracy.

In some embodiments, the training of the graph-based model 132 may occur on a server side, e.g., at the stereoscopic image module 130 when positioned remotely from the machine 122. Additionally or alternatively, the training of the graph-based model 132 may be a one-time process, after which generation of the second digital image 112 and stereoscopic image 120 may be enabled. In other embodiments, the training of the graph-based model 132 may occur on an as-needed basis, a rolling basis (e.g., continually), or on an interval basis (e.g., a predetermined schedule). As an example of an as-needed basis, inaccuracies or safety threats may come to light, e.g., in the event of a safety violation or accident. In such a case, additional training focused on inaccuracies or safety threats may be provided to the graph-based model 132. Additionally or alternatively, one or more aspects of training of the graph-based model 132 may occur at the machine 122, e.g., via the detection application 124. As an example, feedback may be received at the graph-based model 132 from: the detection application 124 via the machine 122, a user of the machine 122 via the machine 122, a third-party such as a law enforcement officer, etc.

Modifications, additions, or omissions may be made to the environment 105 without departing from the scope of the present disclosure. For example, the environment 105 may include other elements than those specifically listed. Additionally, the environment 105 may be included in any number of different systems or devices.

Figure 2:
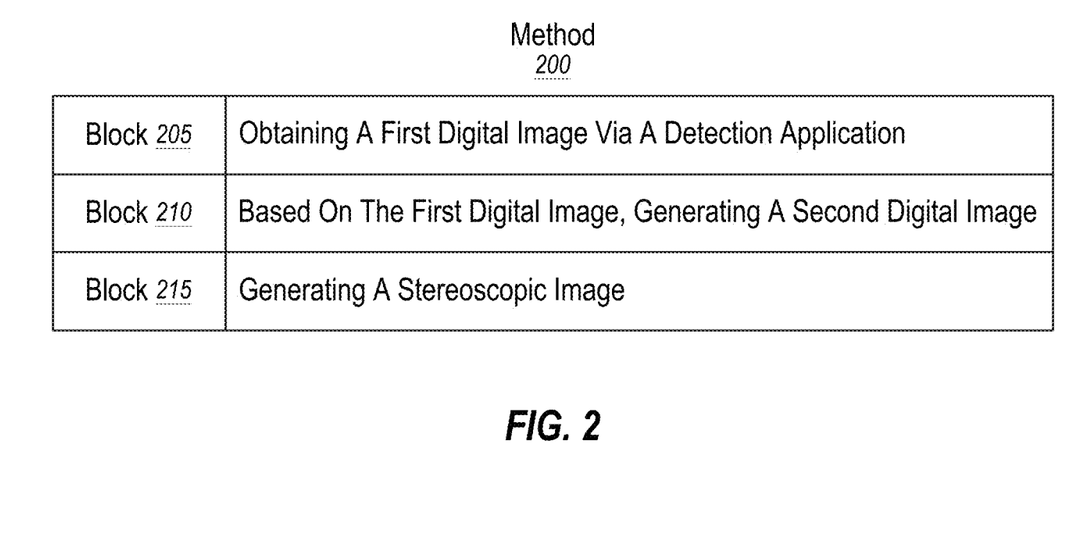
FIG. 2 illustrates an example flow diagram of a method for topological optimization of graph-based models.

FIG. 2 illustrates an example flow diagram of a method 200 for topological optimization of graph-based models. The method 200 may be arranged in accordance with at least one embodiment described in the present disclosure. The method 200 may be performed, in whole or in part, in some embodiments by the software system and/or a processing system, such as a system 300 described below in conjunction with FIG. 3. In these and other embodiments, some or all of the steps of the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 205 at which a first digital image is obtained via one or both of a detection application and a camera sensor. The first digital image may be a monoscopic image that depicts a setting from a first position of the camera sensor communicatively coupled to the detection application. In some embodiments, the first digital image may include a trajectory of a machine.

At block 210, a second digital image may be generated based on the first digital image. The second digital image may be a monoscopic image that depicts a setting from a second position different from the first position. In these or other embodiments, the second digital image is not an image captured by a camera, such as the camera capturing the first digital image of block 205.

At block 215, a stereoscopic image of the setting may be generated. The stereoscopic image may include the first digital image and the second digital image. In these or other embodiments, the stereoscopic image may be an image from which detection and ranging determinations may be based.

One skilled in the art will appreciate that, for this and other methods disclosed in this disclosure, the blocks of the methods may be implemented in differing order. Furthermore, the blocks are only provided as examples, and some of the blocks may be optional, combined into fewer blocks, or expanded into additional blocks.

For example, in some embodiments, one or more additional blocks may be included in the method 200 that include obtaining a plurality of stereoscopic pair images that each includes a first monoscopic image and a second monoscopic image; sending the plurality of stereoscopic pair images as inputs into a graph-based model. In this manner, the graph-based model may be trained to know how to generate a second digital image of block 210 based on the first digital image for subsequent generation of the stereoscopic image of block 215.

Additionally or alternatively, one or more additional blocks may be included in the method 200 that include sending the first digital image as an input into the graph-based model, wherein the second digital image is output from the graph-based model based on one or both of the plurality of stereoscopic pair images and the first digital image input into the graph-based model.

Additionally or alternatively, one or more additional blocks may be included in the method 200 that include generating a depth map that includes a corresponding pixel for each pixel in the stereoscopic image, each corresponding pixel in the depth map representative of relative distance data from the camera sensor for each respective pixel in the stereoscopic image.

Additionally or alternatively, one or more additional blocks may be included in the method 200 that include associating a subset of pixels of a total amount of pixels in the depth map as indicative of an object; and based on a portion of the subset of pixels in the depth map associated with the object, obtaining an actual distance from the camera sensor to the object in the stereoscopic image using: the relative distance data of the portion associated with object; a focal point of the first digital image and the second digital image; and a displacement factor between the first digital image and the second digital image. In some embodiments, obtaining an actual distance to the object may include determining a correction value that compensates for an offset in distance measurements based on perceived depth in the stereoscopic image.

Additionally or alternatively, one or more additional blocks may be included in the method 200 that include sending a warning for presentation via the detection application when the actual distance to the object satisfies a first threshold distance; and/or causing, via the detection application, a machine communicatively coupled to the detection application to perform a corrective action when the actual distance to the object satisfies a second threshold distance. In some embodiments, the first threshold may distance and the second threshold distance may be the same, while in other embodiments, different distances to the detected object. Additionally or alternatively, the first threshold distance and/or the second threshold distance may vary depending on any of a myriad of factors. For example, contributing factors affecting the first and second threshold differences may include: a speed of the machine and/or object, a trajectory of the machine and/or object, regulating rules or laws, a cost/benefit analysis, a risk predictive analysis, or any other suitable type of factor in which a threshold distance between the machine and a detected object may be merited.

In some embodiments, the warning for presentation (e.g., at a display) via the detection application may include a visual warning signal and/or an audible warning signal. Additionally or alternatively, the detection application may cause the machine to perform a corrective action that includes stopping the machine, slowing the machine, swerving the machine, dropping/raising an altitude of the machine, an avoiding maneuver, or any other suitable type of corrective action to mitigate damage to the machine and the object and/or prevent contact between the machine and the object.

Additionally or alternatively, one or more additional blocks may be included in the method 200 that include determining a presence of an object within the stereoscopic image; and based on image recognition processing of the object via a graph-based model, classifying the object. In some embodiments, determining a presence of an object within the stereoscopic image may include an analysis of pixels within the stereoscopic image and/or within the depth map. For example, if a group of pixels form an example shape or comprise a particular color or gray-scale, the presence of an object may be inferred. In these or other embodiments, recognition of the object may be a separate step.

In some embodiments, image recognition may include image recognition training of a graph-based model. For example, the graph-based model may be fed input data (e.g., images of objects), and output of the graph-based model (e.g., guesses) may be compared to expected results such as predetermined or human designated labels. With additional cycles through the input data, weights, biases, and other parameters in the graph-based model may be modified to decrease the error rate of the guesses. For example, weights in the graph-based model may be adjusted so that the guesses better match the predetermined or human designated labels of the images of objects.

In these or other embodiments, the input data fed to the graph-based model for training purposes may include images of a host of different objects. Hundreds, thousands, or millions of images of objects may be provided to the graph-based model. Additionally or alternatively, the images of the objects provided to the graph-based model may include labels that correspond to one or more features, pixels, boundaries, or any other detectable aspect of the objects.

In these or other embodiments, additional or alternative image recognition techniques may be used with the graph-based model to classify the objects. Examples may include using: greyscale; RGB (red, green, and blue) values ranging from, for example, zero to 255; pre-processing techniques (e.g., image cropping/flipping/angle manipulation, adjustment of image hue, contrast and saturation, etc.); testing subsets or small batch sizes of data as opposed to entire datasets and max-pooling to reduce the dimensions of an image by taking the maximum pixel value of a grid.

Figure 3:
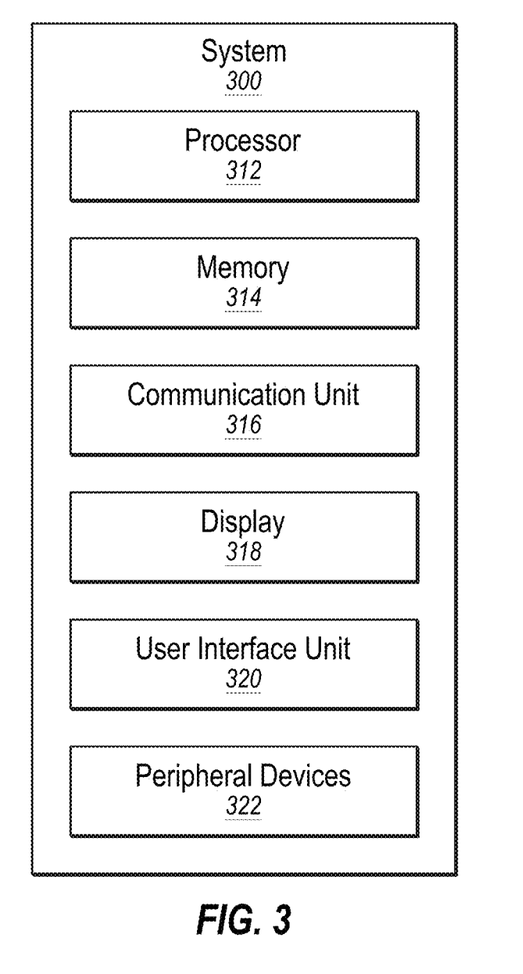
FIG. 3 illustrates an example system that may be used in topological optimization of graph-based models.

FIG. 3 illustrates an example system 300 that may be used in topological optimization of graph-based models. The system 300 may be arranged in accordance with at least one embodiment described in the present disclosure. The system 300 may include a processor 310, memory 312, a communication unit 316, a display 318, a user interface unit 320, and a peripheral device 322, which all may be communicatively coupled. In some embodiments, the system 300 may be part of any of the systems or devices described in this disclosure.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described in this disclosure. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related detection and ranging based on a single monoscopic frame. In these and other embodiments, instructions may be used to perform one or more operations or functions described in the present disclosure.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage median which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 316 may permit data to be exchanged with a network and/or any other devices or systems described in the present disclosure.

The display 318 may be configured as one or more displays, like an LCD, LED, or other type of display. For example, the display 318 may be configured to present topologies, indicate mutations to topologies, indicate warning notices, show validation performance improvement values, display weights, biases, etc., and other data as directed by the processor 310.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310. In some embodiments, the user interface unit 320 and the display 318 may be combined.

The peripheral devices 322 may include one or more devices. For example, the peripheral devices may include a sensor, a microphone, and/or a speaker, among other peripheral devices.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited timber (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about," "substantially," and "approximately" should be interpreted to mean a value within 10% of an actual value, for example, values like 3 mm or 100% (percent).

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the of the present disclosure.

What is claimed is:

1. A method for detecting and ranging objects during operation of a vehicle, comprising:
    during operation of the vehicle, obtaining a first digital image via a detection application associated with the vehicle, the first digital image being a monoscopic image depicting a setting observable from the vehicle from a first position of a camera sensor communicatively coupled to the detection application, the setting including an object;
    based on the first digital image, generating a second digital image that is monoscopic and depicts the setting from a second position different from the first position;
    generating a stereoscopic image of the setting that includes the first digital image and the second digital image;
    generating a depth map that includes a corresponding pixel for each pixel in the stereoscopic image, each corresponding pixel in the depth map being representative of relative distance data from the camera sensor for each respective pixel in the stereoscopic image, the depth map containing information associated with a position of an object with respect to the vehicle;
    associating a subset of pixels of a total amount of pixels in the depth map as being indicative of the object;
    based on a portion of the subset of pixels in the depth map associated with the object, obtaining an actual distance from the camera sensor to the object in the stereoscopic image using:
        the relative distance data of the portion associated with the object;
        a focal point of the first digital image and the second digital image; and
        a displacement factor between the first digital image and the second digital image; and
    making the information associated with the position of the object available for use while the vehicle is operated during a period of time in which the object is observable from the vehicle.

2. The method of claim 1, further comprising:
    obtaining a plurality of stereoscopic pair images, each including a first monoscopic image and a second monoscopic image; and
    sending the plurality of stereoscopic pair images as inputs into a graph-based model.

3. The method of claim 2, further comprising:
    sending the first digital image as an input into the graph-based model, wherein the second digital image is output from the graph-based model based on one or both of the plurality of stereoscopic pair images and the first digital image input into the graph-based model.

4. The method of claim 1, wherein making the information associated with the position of the object available comprises:
sending a warning for presentation via the detection application when the actual distance to the object satisfies a first threshold distance; or
causing, via the detection application, a machine communicatively coupled to the detection application to perform a corrective action when the actual distance to the object satisfies a second threshold distance.

5. The method of claim 1, wherein obtaining the actual distance to the object includes determining a correction value that compensates for an offset in distance measurements based on perceived depth in the stereoscopic image.

6. The method of claim 1, further comprising:
determining a presence of the object within the stereoscopic image; and
based on image recognition processing of the object via a graph-based model, classifying the object.

7. The method of claim 1, wherein the first digital image includes a trajectory of the vehicle.

8. A system for detecting and ranging objects during operation of a vehicle, comprising:
a display;
a processor coupled to the display and configured to direct data to be presented on the display; and
at least one non-transitory computer-readable media communicatively coupled to the processor and configured to store one or more instructions that when executed by the processor cause or direct the system to perform operations comprising:
during operation of the vehicle, obtaining a first digital image via a camera sensor associated with the vehicle, the first digital image being a monoscopic image depicting a first area of a setting observable from the vehicle from a first position of a camera sensor communicatively coupled to the vehicle, the setting including an object;
based on the first digital image, generating a second digital image that is monoscopic and depicts the setting from a second position different from the first position;
generating a stereoscopic image of the setting that includes the first digital image and the second digital image;
generating a depth map that includes a corresponding pixel for each pixel in the stereoscopic image, each corresponding pixel in the depth map being representative of relative distance data from the camera sensor for each respective pixel in the stereoscopic image, the depth map containing information associated with a position of an object with respect to the vehicle;
associating a subset of pixels of a total amount of pixels in the depth map as being indicative of the object;
based on a portion of the subset of pixels in the depth map associated with the object, obtaining an actual distance from the camera sensor to the object in the stereoscopic image using:
the relative distance data of the portion associated with the object;
a focal point of the first digital image and the second digital image; and
a displacement factor between the first digital image and the second digital image; and
making the information associated with the position of the object available for use while the vehicle is operated during a period of time in which the object is observable from the vehicle.

9. The system of claim 8, wherein the operation of making the information associated with the position of the object available comprises:
sending a warning for presentation at the display via a detection application when the actual distance to the object satisfies a first threshold distance; or
causing, via the detection application, a machine communicatively coupled to the detection application to perform a corrective action when the actual distance to the object satisfies a second threshold distance.

10. The system of claim 8, wherein obtaining the actual distance to the object includes determining a correction value that compensates for an offset in distance measurements based on perceived depth in the stereoscopic image.

11. The system of claim 8, wherein the operations further comprise:
determining a presence of the object within the stereoscopic image; and
based on image recognition processing of the object via a graph-based model, classifying the object.

12. The system of claim 8, wherein the first digital image includes a trajectory of the vehicle.

13. A system for detecting and ranging objects during operation of a vehicle, comprising:
a processor; and
at least one non-transitory computer-readable media communicatively coupled to the processor and configured to store one or more instructions that when executed by the processor cause or direct the system to perform operations comprising:
during operation of the vehicle, obtaining a first digital image via a camera sensor associated with the vehicle, the first digital image being a monoscopic image depicting a first area of a setting observable from the vehicle from a first position of a camera sensor communicatively coupled to the vehicle, the setting including an object;
based on the first digital image, generating a second digital image that is monoscopic and depicts the setting from a second position different from the first position;
generating a stereoscopic image of the setting that includes the first digital image and the second digital image;
generating a depth map that includes a corresponding pixel for each pixel in the stereoscopic image, each corresponding pixel in the depth map being representative of relative distance data from the camera sensor for each respective pixel in the stereoscopic image, the depth map containing information associated with a position of an object with respect to the vehicle;
associating a subset of pixels of a total amount of pixels in the depth map as being indicative of the object;
based on a portion of the subset of pixels in the depth map associated with the object, obtaining an actual distance from the camera sensor to the object in the stereoscopic image using:
the relative distance data of the portion associated with the object;
a focal point of the first digital image and the second digital image; and
a displacement factor between the first digital image and the second digital image; and making the information associated with the position of the object available for use while the vehicle is operated during a period of time in which the object is observable from the vehicle.

14. A method for detecting and ranging objects during operation of a vehicle, comprising:
- during operation of the vehicle, obtaining a plurality of first digital images via a detection application associated with the vehicle, the first digital images being monoscopic images depicting a setting observable from the vehicle from first positions of a camera sensor communicatively coupled to the detection application, the setting including an object;
- based on the plurality of first digital images, generating a plurality of corresponding second digital images that are monoscopic and depict the setting from second positions different from the first positions;
- generating a plurality of stereoscopic pair images of the setting that include the plurality of first digital images and the plurality of second digital images;
- sending the plurality of stereoscopic pair images as inputs into a graph-based model,
- sending the first digital images as inputs into the graph-based model, wherein the second digital images are output from the graph-based model based on one or both of the plurality of stereoscopic pair images and the first digital image input into the graph-based model;
- generating a depth map that includes a corresponding pixel for each pixel in the stereoscopic image, each corresponding pixel in the depth map being representative of relative distance data from the camera sensor for each respective pixel in the stereoscopic image, the depth map containing information associated with a position of an object with respect to the vehicle; and
- making the information associated with the position of the object available for use while the vehicle is operated during a period of time in which the object is observable from the vehicle.

\* \* \* \* \*